United States Patent [19]

Pettigrew et al.

[11] Patent Number: 4,940,966
[45] Date of Patent: Jul. 10, 1990

[54] ARTICLE DETECTION AND/OR RECOGNITION USING MAGNETIC DEVICES

[75] Inventors: Robert M. Pettigrew; Stephen H. Chambers; Dafydd G. Davies, all of Cambridge; Michael D. Crossfield, Brackley, all of England

[73] Assignee: Scientific Generics Limited, Cambridge, United Kingdom

[21] Appl. No.: 317,455
[22] PCT Filed: Jun. 8, 1988
[86] PCT No.: PCT/GB88/00447
§ 371 Date: Apr. 10, 1989
§ 102(e) Date: Apr. 10, 1989
[87] PCT Pub. No.: WO88/09979
PCT Pub. Date: Dec. 15, 1988

[30] Foreign Application Priority Data

Jun. 8, 1987 [GB] United Kingdom ............... 8713353

[51] Int. Cl.⁵ .................................................. G08B 13/24
[52] U.S. Cl. ......................................... 340/551; 340/572
[58] Field of Search .................... 340/572, 551; 40/625

[56] References Cited

U.S. PATENT DOCUMENTS

| 4,510,490 | 4/1985 | Anderson, III et al. | 340/572 |
| 4,553,136 | 11/1985 | Anderson, III et al. | 340/572 |
| 4,654,641 | 3/1987 | Ferguson et al. | 340/572 |
| 4,660,025 | 4/1987 | Humphrey | 340/572 |
| 4,727,360 | 2/1988 | Ferguson et al. | 340/572 |
| 4,727,668 | 3/1988 | Anderson et al. | 40/625 |

FOREIGN PATENT DOCUMENTS

| 0096182 | 12/1983 | European Pat. Off. |
| 0121649 | 10/1984 | European Pat. Off. |
| 0214440 | 3/1987 | European Pat. Off. |
| 0216584 | 4/1987 | European Pat. Off. |

*Primary Examiner*—Joseph A. Orsino
*Assistant Examiner*—Thomas J. Mullen, Jr.
*Attorney, Agent, or Firm*—Poms, Smith, Lande & Rose

[57] ABSTRACT

This application discloses a method of recognizing and/or locating preselected categories of articles, which comprises applying to the articles a plurality of magnetic elements in predetermined associations (e.g. with predetermined numbers of magnetic elements and with predetermined spacings between said elements), whereby when the articles are caused to move relative to a predetermined interrogating magnetic field, each particular association of magnetic elements gives rise to a magnetic signature whereby the article or category of article carrying each of the predetermined associations can be recognized and/or located. A series of tags or markers for use in such a method, as well as a system for determining the location and/or identity of an article within an article conveying network, are also disclosed. Typically, one of such a series of tags will have a plurality of magnetic elements (2, 3, 4, 5, 6, 7, 8, 9, 10) whose individual magnetic characteristics, and whose number, shape, location and orientation on a substrate, determine the individual character of the magnetic response of the tag. By varying one or more of these parameters, a large family of magnetically individually recognizable tags can be generated.

6 Claims, 1 Drawing Sheet

ARTICLE DETECTION AND/OR RECOGNITION USING MAGNETIC DEVICES

This invention relates to magnetic devices and to their use in article recognition and/or detection.

The use of magnetic devices to act as antipilferage tags is well known. Typically, the tag is a magnetic medium which is detected when it (and the article to which it is attached) passes through a detection system, typically in the form of a walk-through framework which emits an alternating magnetic interrogation field. This field is designed to interact with a tag which has not been subjected to the routine deactivation procedure and to respond by, for example, triggerring a warning signal in the event that detection of a non-deactivated tag occurs. The tag can be deactivated when a shop assistant carries out the routine procedure at the time of effecting a sale. Deactivation is usually effected by applying a magnetic field to the tag which itself includes a deactivation layer, generally in the form of a magnetically semi-hard material with a high coercive force, located close to the active element in the tag. The semi-hard deactivating layer can be magnetised by a strong magnetic field and as a result the magnetised deactivating layer prevents the magnetically soft active layer from responding when subjected to an alternating magnetic field. Such deactivation prevents detection of the magnetic tag by the detection system.

The shape of the material making up the active element of the magnetic marker strongly affects the magnetization response to an external magnetic field, because of the demagnetization factor N, which is dependent on the shape. Known markers take the form of amorphous metal ribbon ferromagnets which are formed by melt-spinning or similar techniques. These ribbons are relatively thick, generally over 10 microns and often about 25 microns in thickness.

The shape-dependent demagnetizing field $\Delta H$ is equal to the product of the shape-dependent demagnetization factor N and the intensity of magnetization M.

The effective permeability ($\mu_e$) of the tag can be derived approximately by the following formula:

$$\frac{1}{\mu_e} = \frac{1}{\mu_i} + N$$

where $\mu_i$ is the intrinsic permeabilty of the magnetic coating, and N is the demagnetisation factor; this (N) can be calculated as a function of the shape of the article. The inverse of the demagnetisation factor can be termed the shape factor (1/N).

The effective permeability of the active component of a tag thus depends not only on the intrinsic permeability of the material of which it is formed, but also on its shape. The lower the demagnetisation factor, the closer is the effective permeability to the intrinsic permeability. Low demagnetisation factors are also desirable since they permit a lower intensity interrogation field to be used.

We have discovered that the use of similar magnetic devices can be extended to detection/recognition systems, by means of which different types of magnetic device can be distinguished and hence also the article or class of article on which they are carried may be distinguished and identified, or the location of a given type of article may be found.

In particular, several elements with either different ferromagnetic material compositions and hence a variety of magnetically nonlinear characteristics, or several different magnetically soft and/or hard and/or semi-hard elements in proximity to one another can be used. The hard or semi-hard magnetic material acts (to a greater or lesser extent depending on magnetic and physical parameters such as coercivity, volume and spacing) as a clamp which holds the soft material in a fixed magnetic state in which there is a specific response to an interrogating (generally alternating) field. Various combinations of the different elements thus characterise different objects, and give rise to specific magnetic signatures.

According to one aspect of the present invention, there is provided a method of recognising and/or locating preselected categories of articles, which comprises applying to the articles a plurality of magnetic elements in predetermined associations (e.g. with predetermined numbers of magnetic elements and with predetermined spacings between said elements), whereby when the articles are caused to interact with a predetermined interrogating magnetic field, each particular association of magnetic elements gives rise to a magnetic signature whereby the article or category of article carrying each of the predetermined associations can be recognised and/or located.

Examples of such associations include (1) sets of hard and soft magnetic element pairs where the hard elements have various remanent magnetizations, and (2) several soft magnetic elements spaced various distances from one or more hard magnetic elements. The hard (permanent) magnetic element serves to bias the magnetic response of a soft element such that the centre of the hysteresis loop is displaced from zero applied field, so that a small constant or quasi-static external field, $H_x$ must be applied to excite the full non-linear properties of the soft element. In associations of type (1), the various pairs, with soft elements all spaced identically from their respective hard element, will show various $H_x$ because of the various magnetizations shown by the hard elements, different combinations of which can characterise different objects. In associations of type (2), the various soft elements will experience different bias fields and show a variety of $H_x$ because of the difference in the distances to the biasing element.

The or each soft magnetic element may be an amorphous metal ribbon, typically from 10 to 50 microns in thickness, and which may be formed, for example, by melt spinning. Alternatively, the or each soft magnetic element may be a thin coating of an amorphous metal glass of high intrinsic magnetic permeability, with low or substantially zero magnetostriction, and with low coercivity; and which is preferably not greater than 6 microns in thickness.

According to a second aspect of the present invention there is provided a method of controlling the nonlinear magnetic characteristics of a magnetic marker or tag, which comprises applying to an article a plurality of magnetic elements of selected shapes and/or with predetermined magnetic characteristics and/or spacings.

Hence, it is proposed to control nonlinear magnetic characteristics by control inter alia of the element shape and hence the demagnetization factor N. Thus a variety of elements of different shape (hence of different N) can be used for article coding. Preferably the markers are approximately ellipsoidally shaped elements, and/or are of a shape in which the demagnetization factors along two or more mutually angled (e.g. mutually orthogonal) directions are preselected. This could also involve the use of thin film and/or thick magnetic markers.

The nonlinear characteristics of soft ferromagnetic tagging elements are usually detected and measured by a rapidly varying magnetic field of one or more frequencies $f_d$ in the range 500 Hz to 100 kHz applied over a large interrogation volume. Because the soft magnetic element has a nonlinear magnetic response, signal components which are not present in the interrogation field, are generated. These signals, which are harmonically related to the frequency or frequencies $f_d$ are detected to indicate the presence of the soft magnetic element. The special indentification configurations described above are characterised by a displacement (due to $H_x$) or a shear (due to N) of the hysteresis loop of the soft magnetic material. The article recognition system needs to be capable of distinguishing these changes in the nonlinear magnetic characteristics of the soft element. This can be achieved by the addition to the interrogating field of a slowly scanned bias field such as a slowly varying magnetic field with a frequency $f_s$ below 500 Hz and advantageously below 100 Hz. The value of the bias field at which the nonlinear response of each soft element is maximized can be measured and used to characterise each element. The phase and amplitude of the detected signal frequencies, $f_d$, as a function of the amplitude of the scanning field at the low frequency, $f_s$, can be used as a more sophisticated characterising feature.

According to another aspect of the present invention, there is provided a method of recognising and/or detecting an article at a given point in the course of its movement from a first location to a second location, which comprises securing to said article while it is at said first location a magnetic device which comprises a plurality of magnetic elements in a predetermined association (e.g. with predetermined numbers of magnetic elements and with predetermined spacings between said elements), at least one of said magnetic elements being a soft magnetic material with low coercivity, high intrinsic permeability and low or zero magnetostriction, and at least one other of said magnetic elements being a semi-hard magnetic material; subjecting the article carrying said magnetic device to a predetermined interrogating magnetic field at said given point and observing the interaction between the interrogating field and the magnetic device carried by the article; deducing from said observed interaction the nature of the article; and allowing the article to travel from said given point to said second location.

In one embodiment of the invention, the first location is a store where a multiplicity of articles of various types are held for distribution; for example, the store of articles may be a warehouse or the stock room of a retail shop. Each different type of article (identified according to any convenient system — e.g. by the character of the goods; by their price, origin, date of manufacture and/or packing, 'use by' date, and contents; or by combinations of such parameters) will carry a magnetic device characteristic of its type. Different characteristics are achieved by adopting different associations between magnetic elements. Thus by using a predetermined number of magnetic elements and a predetermined number of mutual orientations/spacings between respective elements in the magnetic device, a large number of permutations is possible each of which has a specific magnetic 'signature' — i.e. a specific, detectable interaction with the interrogating field which can be differentiated from the interaction of the other magnetic devices with the same interrogating field. With such a system, the 'given point' may be a point of sale within a shop, and the 'second location' may be the exit from the shop.

In an alternative embodiment, the first location may be a distribution point for letters, packages and the like; the given point may be a sorting office; and the second location may be the address to which the articles are to be despatched.

In a third embodiment, the first point can be a point of access to an underground pipe system, the given point may be at a site where the contents of the pipe system are inaccessible, but the pipe itself is accessible; and the second location can be any point downstream of the given point. With this embodiment, the passage of a given item or article through the pipe system may be monitored at the given location by magnetic means.

It will be appreciated from the above embodiments, which are given by way of example only, that the method of the invention is susceptible of application in diverse fields of commercial and technical significance.

According to a fourth aspect of the present invention, there is provided a series of magnetic tags or markers which are magnetically distinguishable from each other, characterised in that each tag or marker carries a plurality of magnetic elements including at least one soft magnetic element, the plurality of elements in each of the individually distinguishable tags or markers having a characteristic magnetic signature when subjected to an alternating magnetic field by virtue of at least one of (a) their characteristic magnetic properties; (b) their location; (c) their shape; and (d) their orientation with respect to one another on the tag or marker. A series of such tags or markers will generally be such that each of the magnetically distinguishable tags or markers includes at least one soft magnetic element and at least one hard or semi-hard magnetic element.

According to a fifth aspect of the present invention, there is provided a system for determining the location and/or identity of an article within an article conveying network, which comprises a series of tags as defined above, and a detection system for detection and measurement of the magnetic characteristics of said tags or markers when subjected to an alternating magnetic field.

According to a sixth aspect of the present invention there is provided a magnetic tag or marker comprising a magnetic circuit of magnetostrictive material and having a discontinuity the value of which varies under excitation so as to alter the magnetic field of the magnetic marker.

Such a marker operates on the principle of magnetic circuit modulation. Mechanical resonances of elements with magnetostrictive characteristics have been used previously, with detection of sound waves emitted. In contrast the embodiments of this aspect of the invention are directed to the use of such mechanical resonances (excited either by acoustic or magnetic fields) to produce a corresponding resonance in magnetic properties, which may be detected by magnetic or electromagnetic means. This is achieved in an embodiment by a marker in the form of a magnetic circuit, such as an annulus, with a small break in circuit continuity, such as a fine cut or gap. Mechanical oscillation of this gap will lead to a change in the magnetic field of the magnetic circuit of the marker, which may be detected remotely. This detected signal will be strongest at a frequency related to the mechanical resonance frequency, so that several such elements of different resonance characteristics, in conjunction with a swept or multifrequency interrogation field, can be used for article coding or recognition.

In addition, deactivating elements may be used which are magnetically selectable either by using materials of different coercive force, or elements with different demagnetization factors This would enable the elements characterised by different frequencies to be selectively deactivated, so that article recognition codes may be changed by the user. Such selective deactivation principles are also applicable to deactivatable markers described above and to those known from the prior art.

For a better understanding of the invention, and to show how the same may be put into effect, reference will now be made, by way of example, to the accompanying drawings, in which.

Figure 1:
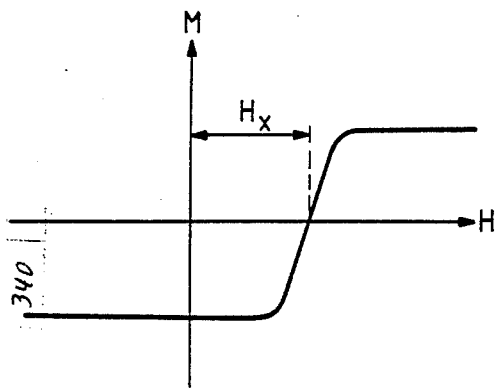
FIG. 1 is a schematic hysteresis plot (intensity cf magnetisation, M, plotted against applied field, H) illustrating one mechanism which may be utilised in the method of this invention.

Referring now to FIG. 1, the effect of a hard magnetic element acting on a soft magnetic element is shown. As explained hereinbefore, the hard (permanent) magnetic element serves to bias the magnetic response of the soft magnetic element so that the centre of the hysteresis loop is displaced from zero applied field (H) by a value $H_x$.

Figure 2:
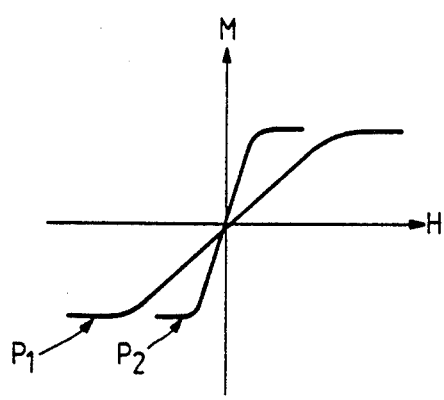
FIG. 2 is a second schematic hysteresis plot showing a second mechanism which may be utilised in the present invention.

Referring now to FIG. 2, two hysteresis plots are shown; the steeper plot Pl represents a typical plot for a soft magnetic material with a low demagnetisation factor, N; and the more oblique plot $P_2$ represents a typical plot for a soft magnetic material with a higher value of N. As explained hereinabove, the degmagnetisation factor, N, is shape-dependent and consequently the hysteresis plot in any given case can be altered in a highly specific manner by altering the shape and/or orientation of one or more soft magnetic elements located in relatively close proximity. This mechanism, together with the magnetic bias effect illustrated in FIG. 1, make it possible to produce a very large number of tags or markers which are recognisably distinct by virtue of their magnetic properties, but which can be produced relatively simply.

Figure 3:
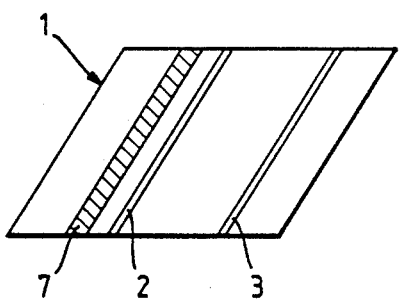
FIGS. 3-5 illustrate different embodiments of tags or markers which may be utilised in the method of this invention.
Figure 4:
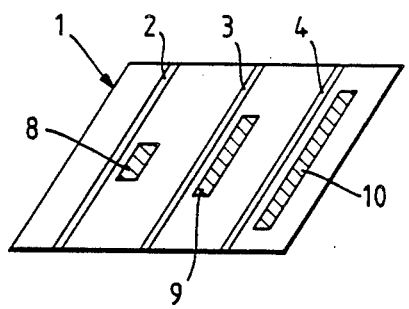
Figure 5:
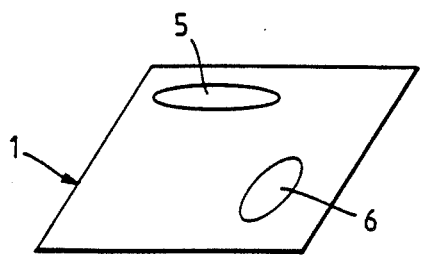

In FIGS. 3-5, three different configurations of magnetic elements (from the almost limitless variety which can be produced) are shown. In each of these FIGURES, a substrate 1 carries a series of magnetic strips or zones 2-6 together with (in FIGS. 1 and 2) one or more hard magnetic strips or zones 7-10. The following Examples illustrate the fabrication and functioning of these particular tags:

EXAMPLE 1

This Example describes the production of a coded tag as shown in FIG. 3 consisting of three components: two soft ferromagnetic elements (2; 3) and a hard magnetic biassing element (7).

The soft magnetic elements 2 and 3 were fabricated from strips of a melt spun amorphous alloy produced by Vacuumschmeltze, designated Vitrovac 6025. The strips were 0.8 mm wide and 25 microns thick. The hard biassing element 7 was a strip of ductile permanent magnetic material, Crovac 250, also produced by Vacuumschmeltze. The permanent magnet strip 7 was 1 mm wide and 50 microns thick. All magnetic elements were initially in the form of reels of the strip material, about 500 m long. The strip of Crovac was fully magnetized along its length by a large current pulse passing through a copper loop which linked the reel of strip. The three elements were then laminated onto a 2 cm wide polymer carrier sheet 1 consisting of 100 micron thick "Mylar" coated with a thin layer of thermoplastic glue. The soft magnetic elements 2 and 3 were laminated onto the sheet so as to lie parallel to the permanent magnet strip, with one soft strip 2 placed at a distance of 0.8 mm from the adjacent edge of the permanent magnet strip 7, and the second strip 3 at 10 mm from strip 7. This spacing was achieved by the use of narrow guide pulleys, close to the point of lamination across which the strips were led as they were being unwound from the reels. A 2 cm wide face paper sheet (not shown) was laminated onto the assembly immediately after the magnetic strips, to disguise and protect the magnetic elements 2, 3 and 7. The completed strip was finally cut into 5 cm lengths which are used as the identifier labels.

The effect of this arrangement was to produce a displacement $H_x$ in the hysteresis loop (see FIG. 1) of approximately 100 A/m in the soft strip closest to the permanent magnet, and only 10 A/m in the more distant strip. Variations in the separations of the strips, achieved by adjustment to the positioning pulleys, led to tags with different combinations of $H_x$ and hence different codings.

EXAMPLE 2

The procedure of Example 1 was repeated but pairs of 5 cm of the magnetic elements lengths were also assembled orthogonal to each other in the form of a cross. This assembly reduces spatial orientation effects in the interrogation field.

EXAMPLE 3

The procedure of Example 1 was repeated except that three soft magnetic strips 2, 3 and 4 each 0.8 mm wide and spaced apart by 8 mm were secured to the substrate 1. Three hard magnetic elements 8, 9 and 10 were likewise deposited on substrate 1. Each of these was 2 mm wide, and the gap between adjacent edges of strips 2 and 8, 3 and 9 and 4 and 10, respectively was 0.8 mm. Strip 8 was 1 cm long; strip 9 was 2 cm long; and strip 10 was 4 cm long. Variations in strip dimensions and separations allow a very large number of uniquely identifiable tags to be produced.

EXAMPLE 4

This Example describes the production of a thin film tag consisting of several thin film soft magnetic components of various shapes. The soft magnetic components were made by sputtering a layer of amorphous metal glass onto a polymer film and cutting the desired shapes from the coated film.

Sputtering is a physical vapour deposition process, carried out in a vacuum chamber, in which ions of gas, usually argon, are accelerated across a potential difference with sufficient force to eject atoms from a target. The ejected atoms travel through the partial vacuum until they collide with a surface on which they can condense forming a coating. In this example, the target was an alloy capable of forming an amorphous metal glass and consisting of cobalt (66 atom %), iron (4 atom molybdenum (2 atom %), silicon (16 atom %) and boron (12 atom %). The targets were manufactured by hot isostatic pressing (HIPing). With this technique, an initial ingot was made from the elements by induction melting under vacuum. The ingot was pulverised to yield a powder with maximum particle size 0.5 mm diameter. The powder was then thoroughly mixed to ensure even distribution of elements. Next, stainless steel 'cans' were manufactured to contain the powder during the HIPing process. The cans were formed from a steel block containing a trough to hold the powder, dimensions being determined by the planar magnetron used for sputtering, the trough being the width of the magnetron's 'race track'. The ends of the trough were closed off with stainless steel blocks and it was then filled with the powdered alloy. The surface was covered with a thin stainless steel sheet and sealed under a vacuum of $5 \times 10^{-4}$ torr using electron beam welding.

The HIP process was carried out at $1000°$ C.$\pm 10°$ C. and 103 MPa for 120 minutes; this resulted in 100% consolidation of the powder to a crystalline block with uniform distribution of the elements.

Finally the cans were machined to expose the consolidated powder. The stainless steel surround was then shaped to form a backing plate for the target and also a side support for clamping to the magnetron. A number of target tiles manufactured in this way can be butted together to fit any size of magnetron.

The soft magnetic layer was manufactured by sputtering a layer of the amorphous alloy one micron thick onto a continuous web of the polymer 'Upilex' (a cast polyimide manufactured by ICI and resistant to heat up to a temperature of $250°$ C.). Sputtering took place using a low base pressure of around $10^{-6}$ torr and a purified argon gas supply. A low sputtering pressure of around 0.5 Pascals yielded a compact film which, in the finished article, gave a high magnetic permeability.

Elliptical shapes were then cut from the soft magnetic film with appropriately shaped die cutters. Ellipses used were 8 mm major axis and 4 mm minor axis. Sets of two ellipses (5; 6) were then laminated onto a carrier sheet 1 with glue (see FIG. 5) similar to that described in Example 1, though 4 cm wide. Similarly, the magnetic elements were protected by application of a 4 cm wide face sheet (not shown). The two ellipses 5 and 6 were separated on the lamination by 2 cm, and positioned so that their major axes were mutually orthogonal. The laminated sheet was then cut into 4 cm lengths, each containing one set of two ellipses 5 and 6 as shown in FIG. 5.

The finished marker was such that the two soft elements presented two distinctly different hysteresis loops along either of two orthogonal directions. Alterations to the coding were achieved by using alternative elliptical shapes such as 12 mm major axis and 3 mm minor axis.

We claim:

1. A method of recognising and/or detecting an article at a given point in the course of its movement from a first location to a second location, which comprises securing to said article while it is at said first location a magnetic device which comprises a plurality of magnetic elements in a predetermined association (e.g. with predetermine numbers of magnetic elements and with predetermined spacings between said elements), at least one of said magnetic elements being a soft magnetic material with low coercivity, high intrinsic permeability and low or zero magnetostriction, and at least one other of said magnetic elements being a semi-hard magnetic material; subjecting the article carrying said magnetic device to a predetermined interrogating magnetic field at said given point and observing the interaction between the interrogating field and the magnetic device carried by the article; deducing from said observed interaction the nature of the article; and allowing the article to travel from said given point to said second location; said first location being a point of access to an underground pipe system and said given point being a site where said pipe system itself is accessible but where the contents of said pipe system are inaccessible.

2. A method as defined in claim 1 wherein tags or markers are attached to, or associated with, a plurality of said articles, characterised in that each tag or marker carries a plurality of magnetic elements including at least one soft magnetic element, the plurality of elements in each of the individually distinguishable tags or markers having a characteristic magnetic signature when subjected to an alternating magnetic field by virtue of at least one of (a) their characteristic magnetic properties; (b) their location with respect to one another on the tag or marker; (c) their shape; and (d) their orientation with respect to one another on the tag or marker.

3. A method as defined in claim 1 wherein tags or markers are attached to or associated with a plurality of said articles, comprising an element of magnetostrictive material and having a discontinuity the value of which varies under excitation so as to alter the magnetic field of the magnetic marker, the magnetostrictive element being fabricated so that it has a mechanical response the frequency of which also characterises the magnetic response of, and which is a recognisable characteristic of, said element.

4. A method of recognising and/or locating and/or detecting an article in an underground pipe system, which comprises:

(1) positioning said article at a known, accessible first position;

(2) fixing to said article while it is at said first position a magnetic device which comprises a plurality of magnetic elements in a predetermined association (e.g. with predetermined numbers of magnetic elements and with predetermined spacings between said elements), at least one of the magnetic elements being a soft magnetic material with low coercivity, high intrinsic permeability and low or zero magnetostriction, and at least one other of said elements being a semi-hard magnetic material;

(3) subjecting the article carrying said magnetic device to a predetermined interrogating magnetic field while it is at said first position and observing the interaction between the interrogating field and the magnetic device carried by said article to determine the magnetic signature of the combination of said article and said magnetic device; and (4) after said article has been introduced into said underground pipe system, and when it is desired to recognise and/or locate an/or detect said article within the underground pipe system, subjecting a portion of said underground pipe system to said predetermined interrogating field in order to detect the presence or absence of said magnetic signature.

5. A method as defined in claim 4 wherein tags or markers are attached to, or associated with, a plurality of said articles, characterised in that each tag or marker carries a plurality of magnetic elements including at least one soft magnetic element, the plurality of elements in each of the individually distinguishable tags or markers having a characteristic magnetic signature when subjected to an alternating magnetic field by virtue of at least one of (a) their characteristic magnetic properties; (b) their location with respect to one another on the tag or marker; (c) their shape; and (d) their orientation with respect to one another on the tag or marker.

6. A method as defined in claim 4 wherein tags or markers are attached to or associated with a plurality of said articles, comprising an element of magnetostrictive material and having a discontinuity, the value of which varies under excitation, so as to alter the magnetic field of the magnetic marker, the magnetostrictive element being fabricated so that it has a mechanical response, the frequency of which also characterises the magnetic response of, and which is a recognisable characteristic of, said element.

* * * * *